United States Patent [19]

Iwasaki et al.

[11] Patent Number: 4,635,152

[45] Date of Patent: Jan. 6, 1987

[54] MAGNETIC RESONANCE-TYPE PLAYBACK APPARATUS INCLUDING A MAGNETIC MATERIAL HAVING MAGNETIC ANISOTROPY

[75] Inventors: Hitoshi Iwasaki, Tokyo; Shu Chiba; Norikazu Sawazaki, both of Yokohama, all of Japan

[73] Assignee: Kabushiki Kaisha Toshiba, Kawasaki, Japan

[21] Appl. No.: 633,912

[22] Filed: Jul. 24, 1984

[30] Foreign Application Priority Data

Jul. 29, 1983 [JP] Japan ................ 58-138829
Jul. 29, 1983 [JP] Japan ................ 58-138830

[51] Int. Cl.$^4$ ............................. G11B 5/14
[52] U.S. Cl. ...................... 360/110; 360/111
[58] Field of Search .................. 360/110, 111

[56] References Cited

U.S. PATENT DOCUMENTS 4,464,691 8/1984 Sawazaki et al. ............ 360/111

FOREIGN PATENT DOCUMENTS 57-36407 2/1982 Japan .

OTHER PUBLICATIONS

D. A. Thompson, L. T. Romankiw and A. F. Mayadas, "Thin Film Magnetoresistors in Memory, Storage, and Related Applications", IEEE Trans. Mag., vol. Mag-11, No. 4 (1975).
D. O. Smith; J. Appl. Phys., vol. 29, p. 264 (1958).

*Primary Examiner*—Robert S. Tupper
*Attorney, Agent, or Firm*—Oblon, Fisher, Spivak, McClelland, & Maier

[57] ABSTRACT

A magnetic playback apparatus using ferromagnetic resonance of a magnetic material provided with a magnetic anisotropy to develop an anisotropic magnetic field. The magnetic material is disposed at a position influenced by a magnetic field resulting from a signal recorded on the magnetic recording medium. The magnetic material is coupled with a high frequency circuit to be supplied with a high frequency magnetic field. The high frequency characteristics of the magnetic material greatly vary depending on a ferromagnetic resonance. A ferromagnetic resonance magnetic field is set up, allowing for the magnitude of an anisotropic magnetic field and the frequency of the high frequency magnetic field, so that a great variation in the high frequency characteristics due to the ferromagnetic resonance may be obtained according to the signal magnetic field.

20 Claims, 21 Drawing Figures

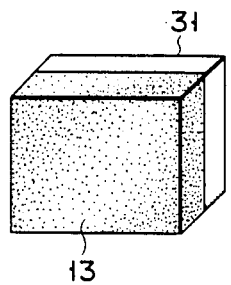
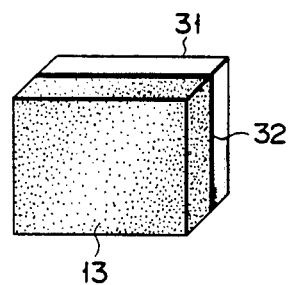
FIG. 7A  FIG. 7B
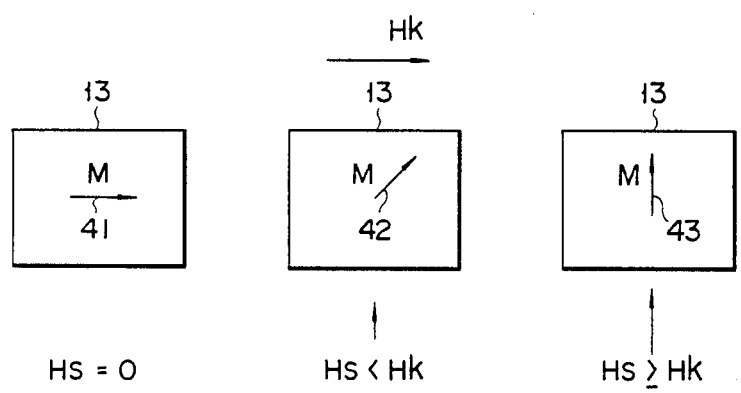
FIG. 8
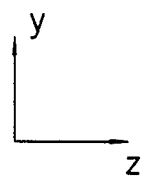

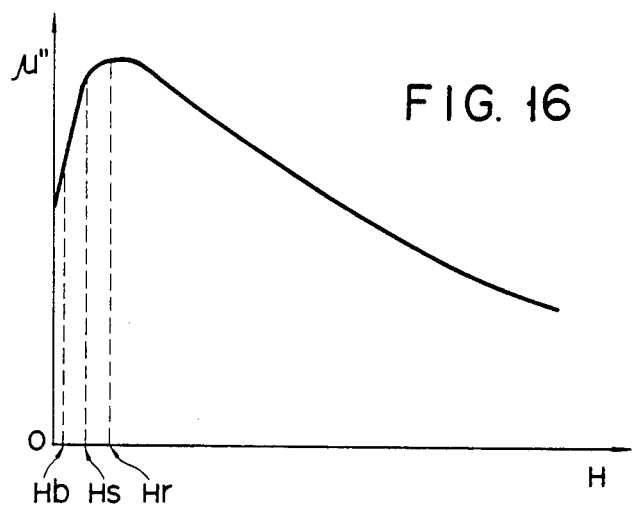
FIG. 16
FIG. 17A  FIG. 17B  FIG. 17C
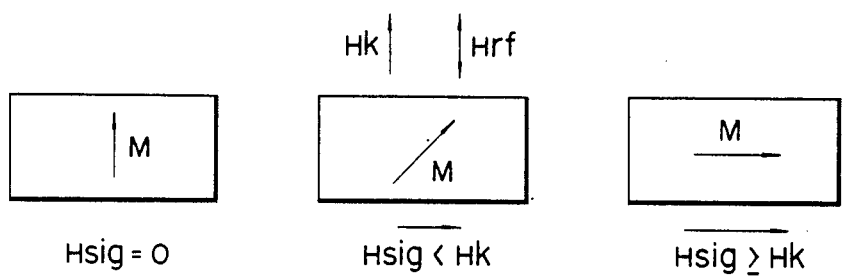
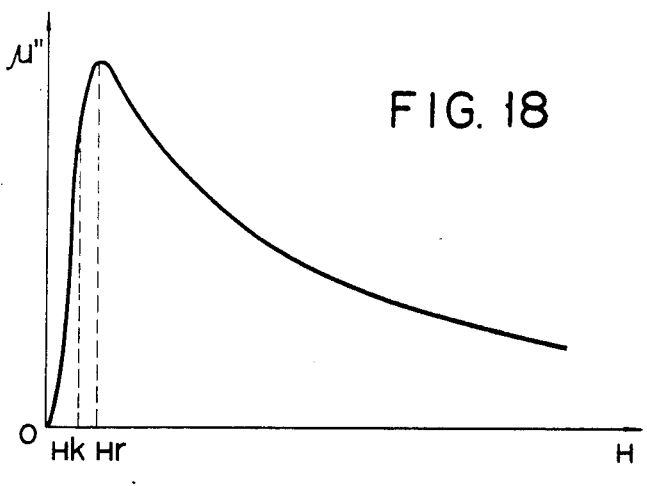
FIG. 18

MAGNETIC RESONANCE-TYPE PLAYBACK APPARATUS INCLUDING A MAGNETIC MATERIAL HAVING MAGNETIC ANISOTROPY

BACKGROUND OF THE INVENTION

The present invention relates to an apparatus for reproducing signals recorded on a magnetic recording medium and, more particularly, to a magnetic playback apparatus arranged to detect during signal reproduction a signal magnetic field from the magnetic recording medium in the form of a change in high-frequency characteristics of a magnetic material.

A magnetic playback system is known which uses a magnetoresistance effect according to which a variation in electromagnetic characteristics of a magnetic material due to a magnetic field from a magnetic recording medium generated by a recorded signal is detected to reproduce the recorded signal.

Another playback system suitable for high-density recording and playback is disclosed in Japanese Patent Early Publication No. 57-36407. This system uses a variation of a tensor permeability $\mu'$ and its loss term $\mu''$ as a change in high frequency characteristics of a magnetic material, which is caused by recorded magnetic field. A magnetic material, such as ferrite, permalloy, or amorphous alloy, is used for a playback head. A high frequency circuit is coupled with the playback head. To reproduce the recorded signal, an output voltage of the high frequency circuit, which varies due to a change of the circuit impedance, is detected and rectified.

Generally in a high frequency magnetic field, $\mu'$ and $\mu''$ of a magnetic material are changed due to low magnetic field loss observed in the nonsaturation region of the magnetic material, and the ferromagnetic resonance absorption occuring in the saturation region of the magnetic material in a high magnetic field. The change of $\mu'$ and $\mu''$ due to the ferromagnetic resonance is much greater than that due to the low magnetic field loss. Therefore, if the ferromagnetic resonance is employed, a slight change of the magnetic field can greatly change the impedance of the high frequency circuit, thus permitting a playback at a very high sensitivity and a good S/N ratio. The above publication describes the playback system using the ferromagnetic resonance absorption.

For actually sensing a recorded magnetic field by using the ferromagnetic resonance, an operation point must be set to cause a great variation of $\mu'$ and $\mu''$ resulting from the ferromagnetic resonance. To realize this, a great bias magnetic field is needed in addition to the recorded magnetic field. Providing a magnetic source adjacent to the magnetic recording medium will possibly create some problems such as demagnetization of the recorded magnetic field depending on the intensity and the direction of the bias magnetic field.

SUMMARY OF THE INVENTION

Accordingly, an object of the present invention is to provide an improved magnetic playback apparatus using a ferromagnetic resonance of a magnetic material.

Another object of the present invention is to provide a magnetic playback apparatus using the ferromagnetic resonance of a magnetic material, which is arranged to saturate the magnetic material without a bias magnetic field for a high sensitivity reproduction.

Yet another object of the present invention is to provide a magnetic playback apparatus which is arranged to keep a magnetic material in a high permeability state without using a bias magnetic field for a high-sensitivity and high-fidelity playback.

A further object of this invention is to provide a magnetic playback apparatus arranged to keep a magnetic material adapted to detect a signal magnetic field in a high-permeability state so that the magnetic material has its high-frequency characteristics greatly varied with a variation in the signal magnetic field, thereby permitting a high-sensitivity reproduction of short-wavelength signals.

BRIEF DESCRIPTION OF THE DRAWINGS

FIGS. 7A and 7B show other structural arrangements of the magnetic material shown in FIG. 6;

FIG. 8 shows changed orientations of a magnetic moment of the magnetic material when an easy axis of magnetization is applied to the magnetic material in the direction of the track width of the magnetic material and a recording magnetic field $H_S$ is applied in the direction normal to the track plane of the magnetic material, and the magnetic field $H_S$ is changed;

FIG. 16 shows a graphical representation of a variation of the loss $\mu''$ of a Co amorphous alloy against a magnitude of an external magnetic field;

FIGS. 17A, 17B, and 17C shows changed orientations of a magnetic moment of a magnetic material when the magnetic material is subjected to an anisotropic magnetic field, which is orthogonal to a signal magnetic field and in parallel with a high frequency magnetic field; and FIG. 18 shows a variation of the loss $\mu''$ of an Ni-Fe alloy against an external magnetic field, when the alloy is subjected to an anisotropic magnetic field shown in FIG. 17.

DETAILED DESCRIPTION OF THE PREFERRED EMNODIMENTS

Figure 1:
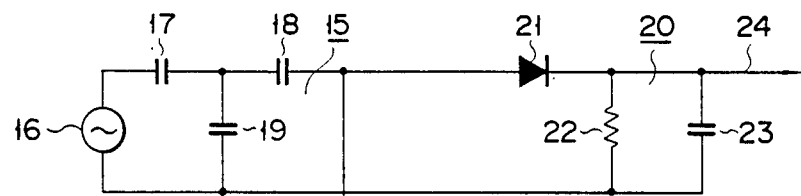
FIG. 1 schematically shows a magnetic playback apparatus which is an embodiment of the present invention.
Figure 1:
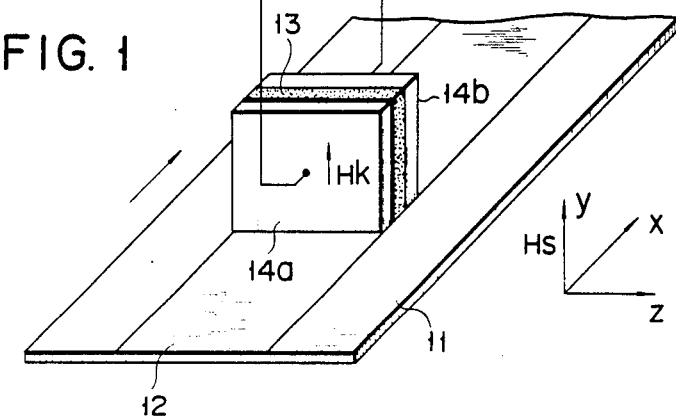

FIG. 1 shows an embodiment of a magnetic playback apparatus according to the present invention. In the figure, reference numeral 11 designates a magnetic recording medium, and numeral 12 a recording track. A playback head is disposed to oppose recording track 12, and composed of a thin-film magnetic material 13 and a pair of electrodes 14a and 14b adhered to both surfaces of magnetic material 13. The magnetic material 13 may be made of conductive magnetic material such as permalloy or amorphous alloy or an insulative magnetic material such as ferrite. For adjusting a characteristic of a high frequency circuit 15 coupled with electrodes 14a and 14b, capacitances may be provided by interposing insulating material such as SiO$_2$ between magnetic material 13 and each of electrodes 14a and 14b. The high frequency circuit 15 comprises a high frequency oscillator 16, matching capacitors 17 and 18, and a resonance capacitor 19. The high frequency oscillator 16 applies a high frequency signal to magnetic material 13 through the electrodes 14a and 14b in the direction of thickness of material 13. Under this condition, the high frequency circuit 16 produces a high frequency output voltage, whose amplitude depends on an impedance change of magnetic material 13 caused by a recorded-signal magnetic field developed by magnetic recording medium 11. The high frequency output voltage of high frequency circuit 15 is applied to a peak detector 20 comprising a diode 21, a resistor 22 and a capacitor 23 to produce reproduced output signal 24.

Figure 2:
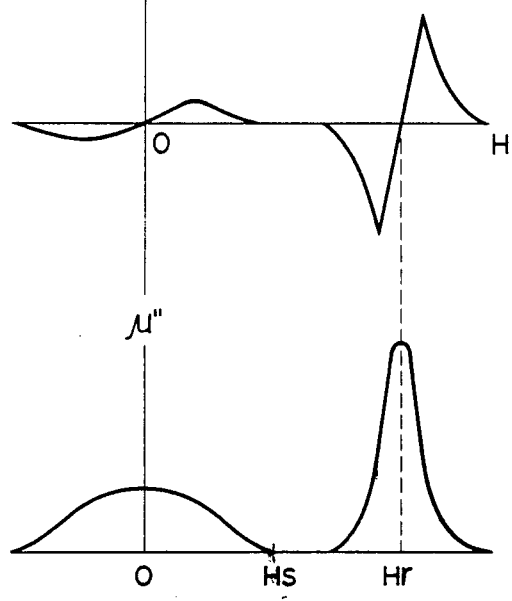
FIG. 2 graphically illustrates relationships of the relationships between the tensol permeability $\mu'$ and the loss $\mu''$ of a magnetic material against a magnitude of an external magnetic field.

Turning now to FIG. 2, there is shown general characteristics of the tensol permeability $\mu'$ and the loss $\mu''$ of a magnetic material in a high frequency magnetic field. H$_R$ is representative of a resonance magnetic field, and Hs a saturation magnetic field. As already stated it will be understood that, the tensol permeability $\mu'$ and the loss $\mu''$ of magnetic material change with greater dependence on the ferromagnetic resonance in a high magnetic field than in a low magnetic field below the saturation magnetic field Hs.

Figure 3:
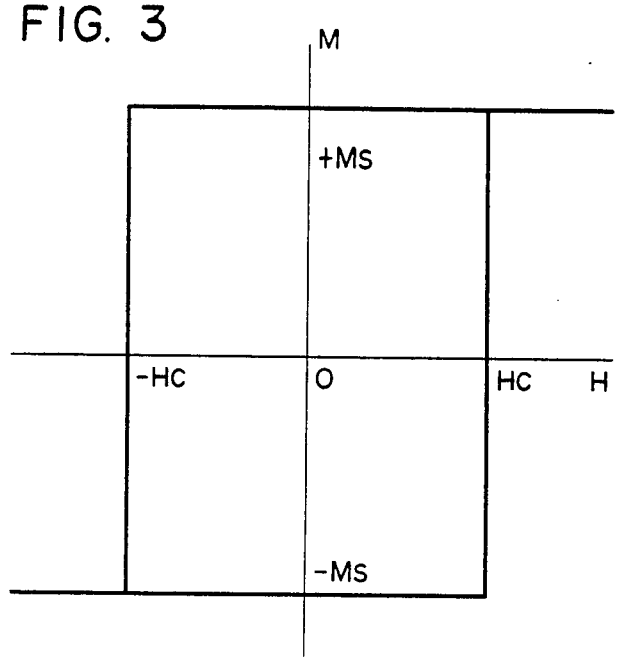
FIG. 3 shows an M-H curve of the magnetic material used in the embodiment of FIG. 1.

Let us assume now that the length direction of recording track 12 is x, the normal direction of track (thickness direction of magnetic recording medium 21) is y, and the width direction of track 12 is z. An easy axis is provided in magnetic material 13 in the same direction (in this example, the direction y) as that of the recorded-signal magnetic field H$_S$ to develop an anisotropic magnetic field H$_K$. An M-H curve of magnetic material 13 in this case becomes as illustrated in FIG. 3. Under this condition, the magnetic material 13 takes a single domain structure or a similar structure. In the single domain structure, magnetic moments are oriented in the direction +y (in FIG. 3, the magnetization M is represented by +Ms) or in the direction −y (the magnetization M is represented by −Ms). When the magnetic field decreases below −Hc, the magnetic moments are switched from +y to −y. On the other hand, when the magnetic field is increased above Hc, the magnetic moments are switched from −y to +y. This fact implies that under recorded-signal magnetic fields H$_S$ smaller than coercive force Hc, the magnetic moments of magnetic material 13 are aligned without application of a bias magnetic field. Therefore, it is possible to cause a ferromagnetic resonance with no bias magnetic field if the conditions for the ferromagnetic resonance are properly set.

The condition causing the ferromagnetic resonance will be given hereafter. An external resonance magnetic field H$_R$ (in the direction y) shown in FIG. 2 is related by a frequency f of a high frequency magnetic field applied to an x-z plane perpendicular to the direction y as follows:

$$f = \gamma [\{H_R + (Nx - Ny)Ms + (Hay - Hax)\}\{H_R + (Nz - Ny)Ms + (Hay - Haz)\}]^{\frac{1}{2}} \quad (1)$$

where
- $\gamma$: Gyromagnetic factor of normally 2.8 MHz/oersted,
- Nx, y, z: Diamagnetic coefficient when the resonance magnetic field (external magnetic field) is in the direction y,
- Ms: Saturation magnetization,
- Hax, ay, az: Anisotropic magnetic field when the resonance magnetic field is in the direction y.

In the embodiment of FIG. 1, the high frequency magnetic field produced by high frequency oscillator 16 rotates in the y-z plane of magnetic material 13. The direction of the high frequency magnetic field (direction z) is orthogonal to that of the signal magnetic field (direction y). Therefore, the ferromagnetic resonance occurs. Substituting into equation (1) Nx=1 and Ny=Nz=0, and H$_{AX}$=H$_{AZ}$=0, H$_{AY}$=H$_K$ (H$_K$ the anisotropic magnetic field in magnetic material 13) yields $$f = \gamma \sqrt{(H_R + M_S + H_K)(H_R + H_K)} \quad (2)$$

Equation (2) indicates that a resonance magnetic field can be set to an arbitrary external magnetic field by selecting the frequency f of the high frequency signal or the magnitude of the anisotropic magnetic field H$_K$. Particularly when the external magnetic field H$_R$=0, equation (2) can be rewritten into $$f = \gamma \sqrt{(M_S + H_K)H_K} \quad (3)$$

Figure 4:
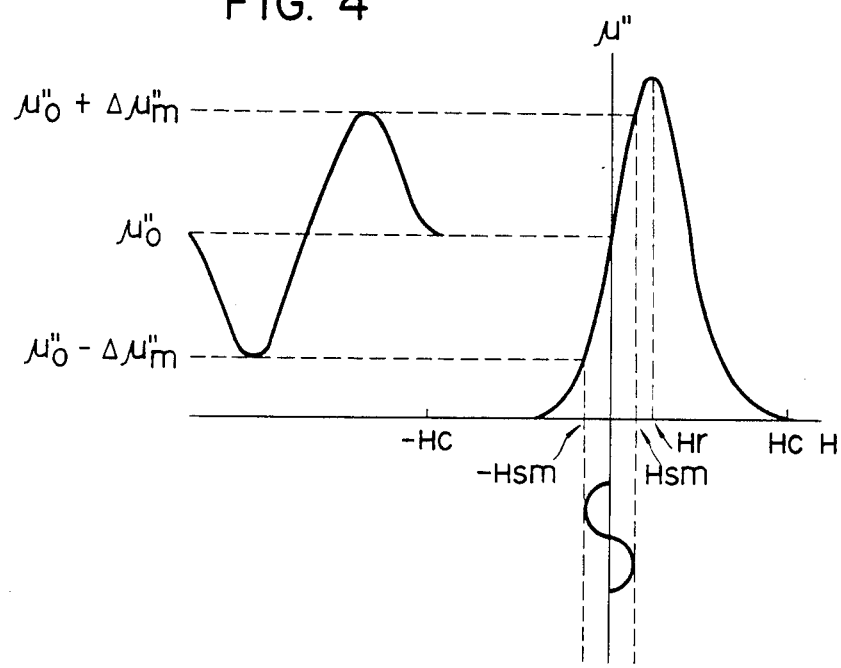
FIG. 4 shows an example of a variation of the loss $\mu''$ against the external magnetic field when the magnetic material in FIG. 1 magnetically resonates.

A description will be given as to how the resonance magnetic field is actually set. The change of $\mu''$ will be used by way of example for ease of understanding. As shown in FIG. 4, the resonance magnetic field is set, in consideration of equation (2), such that the point of a linear portion of $\mu''$-H curve, which has the maximum rate of change, is centered at a point where the external magnetic field is 0. Under this condition, with no application of a bias magnetic field, the variation of the signal magnetic field H$_S$ from −Hsm to +Hsm causes $\mu''$ to vary from $\mu''0 - \Delta\mu''$m to $\mu''0 + \Delta\mu''$m. Specifically, by using the anisotropic magnetic field H$_K$, $\mu'$ and $\mu''$ of magnetic material 13 can be linearly and greatly varied without any external magnetic field. In other words, with no bias magnetic field the variation of the signal magnetic field $H_K$ varies the high frequency characteristic of magnetic material 13 so that a reproduced output signal 24 can be obtained.

Another example for setting the resonance magnetic field will be described, referring to FIG. 5. In this example, the magnitude of the anisotropic magnetic field $H_K$ or the frequency of the applied high frequency signal is selected such that the ferromagnetic resonance occurs when the external magnetic field is zero. In other words, $\mu''$ is set to symmetrically vary with respect to the applied extenal magnetic field of zero. As seen from the graph, when the signal magnetic field Hc varies from $-Hsm$ to $+Hsm$ $\mu''$ varies from $\mu''0$ to $\mu''0-\Delta\mu''m$ at a frequency two times that of the signal magnetic field.

In the above-mentioned embodiments, the easy axis and the signal magnetic field $H_S$ are in the same direction. Therefore, the magnetic moments of magnetic material 13 are kept in the direction of the easy axis even if the signal field $H_S$ is applied. When the easy axis is produced orthogonal or substantially orthogonal to the signal magnetic field $H_S$, the magnetic moments of the magnetic material 13, which are aligned in the direction of the easy axis when the external magnetic field is zero, can be rotated by the signal magnetic field $H_S$, thereby to cause the variation of $\mu'$ and $\mu''$ due to the ferromagnetic resonance.

Figure 6:
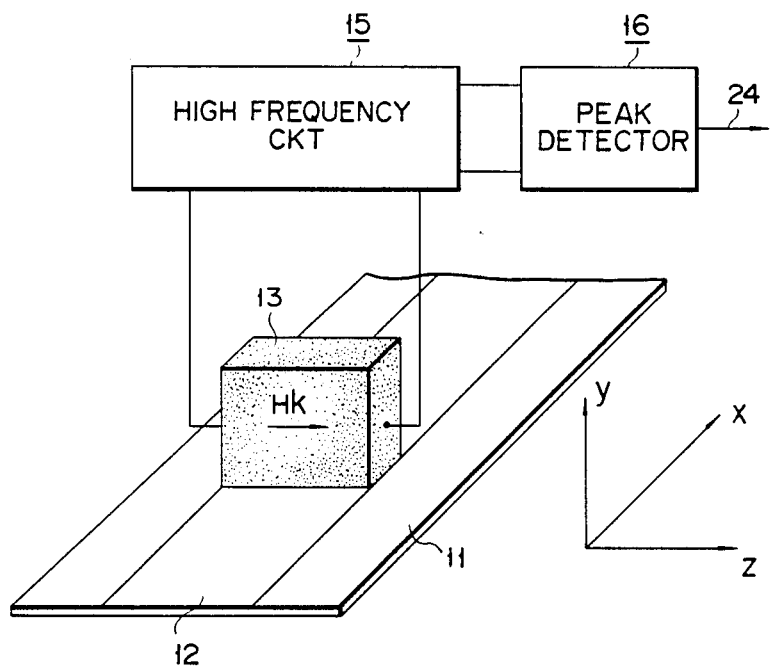
FIG. 6 schematically shows another embodiment of a magnetic playback apparatus according to the present invention.

This is implemented by an arrangement shown in FIG. 6. In the figure, the high frequency circuit 15 is coupled with magnetic material 13 so that a high frequency signal current flows through magnetic material 13 in the width direction (direction z) of recording track 12. The magnetic material 13 may have a double-layer structure with a copper layer 31, for example, as shown in FIG. 7A, or a three-layer structure with a thin insulating layer 32 sandwiched between magnetic material 13 and conductive layer 31. According to the above multi-layer structure use may be made of an insulating magnetic material such as ferrite. On the other hand, the use of conductive magnetic material, such as permalloy or amorphous alloy, decreases the direct-current resistance, resulting in the increase of a Q factor of high frequency circuit 15.

In a case where the easy axis is produced in magnetic material 13 in the direction of the track width (direction z), when a signal magnetic field $H_S$ is applied to magnetic material 13 in the direction perpendicular to the recording surface (direction y), the magnetic moments M align in the direction pointed by an arrow 41 when $H_S=0$. Under this condition, as the signal magnetic field $H_S$ is increased, the magnetic moments M rotate, as indicated by an arrow 42. When the signal magnetic field $H_S$ reaches the anisotropic magnetic field $H_K$, the magnetic moments M are directed vertical to the track surface (in the direction y), as indicated by an arrow 43. Therefore, under the condition that the ferromagnetic resonance is caused, on the basis of equation (2), by the anisotropic magnetic field $H_K$ when $H_S$ is 0, when the magnetic moments M rotate with the increase of signal magnetic field $H_S$ the magnetic material 13 goes out of the ferromagentic resonance. As a result, $\mu'$ and $\mu''$ of magnetic material 13 change so that the signal magnetic field $H_S$ can be detected.

Figure 5:
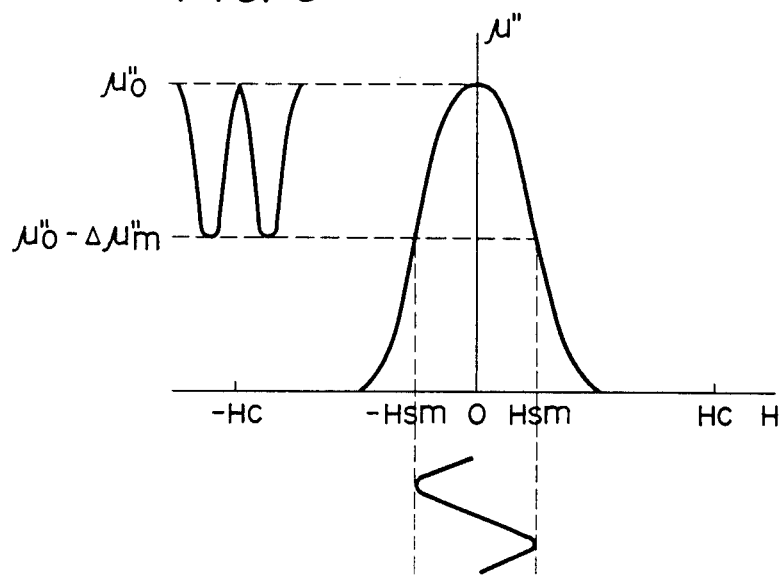
FIG. 5 shows another example of the variation of the loss $\mu''$ illustrated in FIG. 4.

Also in the embodiment of FIG. 1, if the easy axis is applied in the track width direction, then the anisotropic magnetic field $H_K$ becomes perpendicular to the signal magnetic field $H_S$, so that the same variation in $\mu'$ and $\mu''$ will occur as in FIG. 5. In the case of FIG. 1, as mentioned above, since the high frequency magnetic field contains a component perpendicular to the signal magnetic field $H_S$, the ferromagnetic resonance will also occur due to the signal magnetic field $H_S$. With the embodiment of FIG. 6, however, since the high frequency signal current flows through magnetic material 13 in the track width direction, most of the high frequency magnetic field is in parallel with the signal magnetic field $H_S$, and hence the ferromagnetic resonance does not occur by means of the signal magnetic field Hc. For this reason, when compared with the case of FIG. 1, the case of FIG. 6 exhibits a monotonous decrease of $\mu''$ with respect to the signal magnetic field $H_S$. This allows a stable reproduction of a varation of the magnitude of the signal magnetic field $H_S$.

With the embodiments so far described, the magnetic material is provided with magnetic anisotropy with an easy axis of magnetization which is parallel with or normal to the signal magnetic field from the magnetic recording medium. Alternatively, the magnetic material may be provided with an easy axis of magnetization which makes an angle of e.g. 45° with respect to the direction of the signal magnetic field. If the magnetic anisotropy is so made in the magnetic material, the magnetic material always remains in a high-permeability state so that the signal magnetic field may influence apart from the recording medium. This feature is very effective for reproduction of short-wavelength signals whose signal magnetic field abruptly decays with distance from the recording medium. This advantage can also be realized by the embodiment of FIG. 6, which requires, however, a small bias magnetic field, or, a special signal processing since $\mu''$ changes at the double frequency of that of the signal magnetic field.

Figure 9:
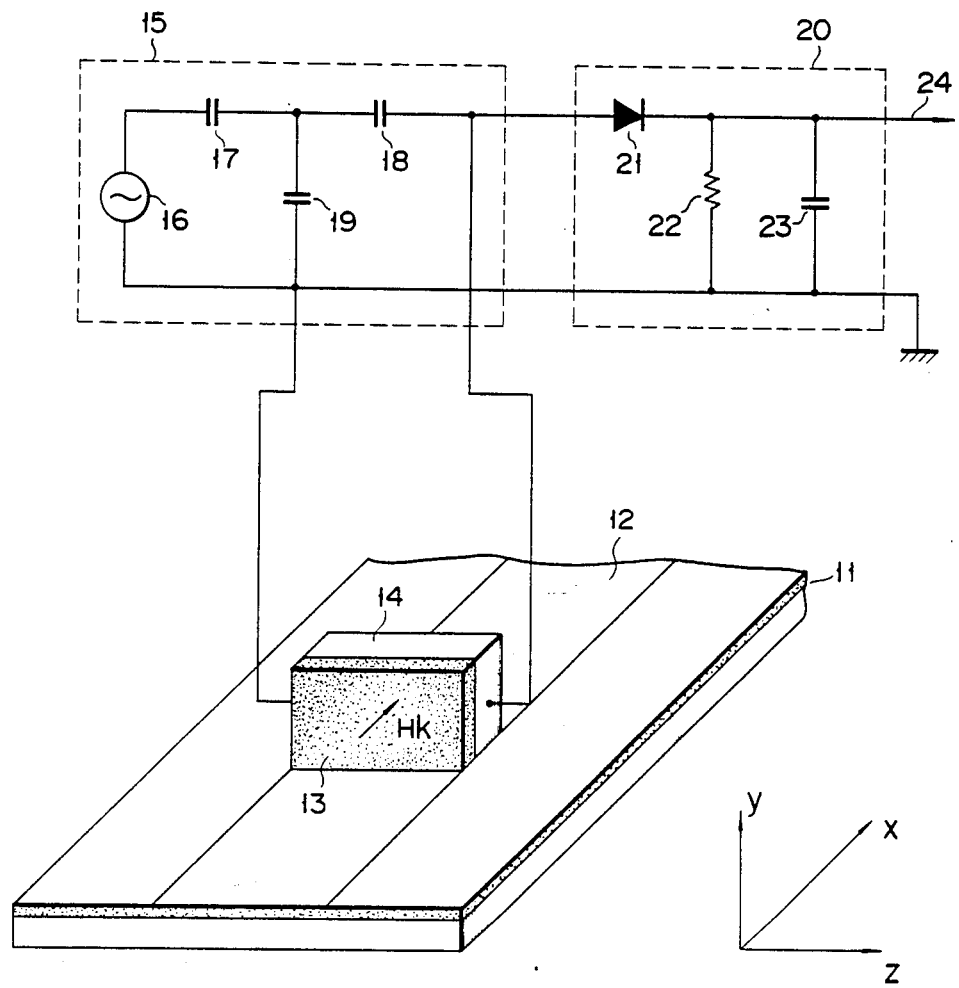
FIG. 9 schematically shows another embodiment of a magnetic playback apparatus according to the present invention.
Figure 10:
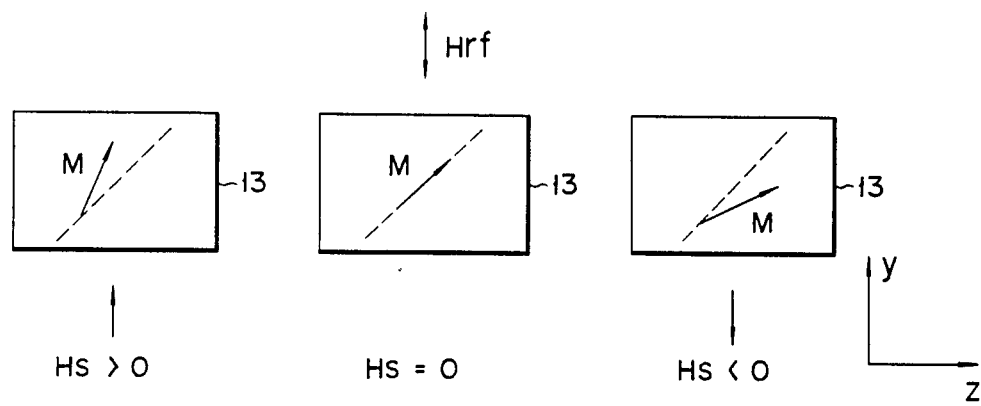
FIG. 10 shows changed orientations of a magnetic moment M of the magnetic material of FIG. 9 for some magnitudes of a signal magnetic field Hs when the magnetic material of FIG. 9 has an anisotropy with an easy axis directed about 45° with respect to the signal magnetic field $H_S$.

Another embodiment of the invention will be described referring to FIG. 9. This embodiment is featured in that a conductive layer 14, coupled with high frequency circuit 15, is in close proximity to or adhered to one side of magnetic material 13. The magnetic anisotropy set up in the magnetic material 13 provides an easy axis slanted about 45° to the signal magnetic field $H_S$ in the y-z plane. Motion of the magnetic moments M of the magnetic material 13 due to the signal magnetic field $H_S$ is illustrated in FIG. 10. A single domain structure is made in which the magnetic moments M are aligned along the easy axis indicated by a broken line when $H_S=0$. Under this condition, when a signal magnetic field $H_S$ is applied in the direction y, the magnetic moments M rotate in the direction of the signal magnetic field $H_S$. Conversely, when a signal magnetic field $H_S$ is applied in the direction $-y$, the magnetic moments M oppositely rotate. In this arrangement, since a high frequency signal current, fed from high frequency circuit 15, flows through conductive layer 14 in the direction z, a high frequency magnetic field $H_{RF}$ is applied to the magnetic material 13 in the direction y. Therefore, as the signal magnetic field $H_S$ is applied in the direction $-y$, the magnetic moments M become orthogonal to the high frequency magnetic field $H_{RF}$. Then, to reproduce a signal recorded on the recording medium by means of a variation in $\mu''$ of magnetic material 13, a ferromagnetic resonance magnetic field $H_R$ of magnetic material 13 is set at a magnetic field slightly larger than the negative maximum signal magnetic field $-H_S$, as indicated by a curve 60 shown in FIG. 11.

With this setting of the magnetic field $H_R$, a good linear variation of $\mu''$ can be obtained at a point of $H_S=0$. Further, a linear variation of $\mu''$ can be obtained, as indicated by a curve 52, with respect to the variation 51 of the signal magnetic field $H_S$. Therefore, this arrangement can faithfully reproduce the recorded signal unlike the embodiment of FIG. 6.

According to the above-mentioned ferromagentic resonance mechanism, the magnetic material 13 is always kept in a high permeability state due to the magnetization rotation caused by the signal magnetic field $H_S$. Therefore, the magnetic material may be used solely. Alternatively, the magnetic material may be used as a part of a magnetic circuit.

Figure 11:
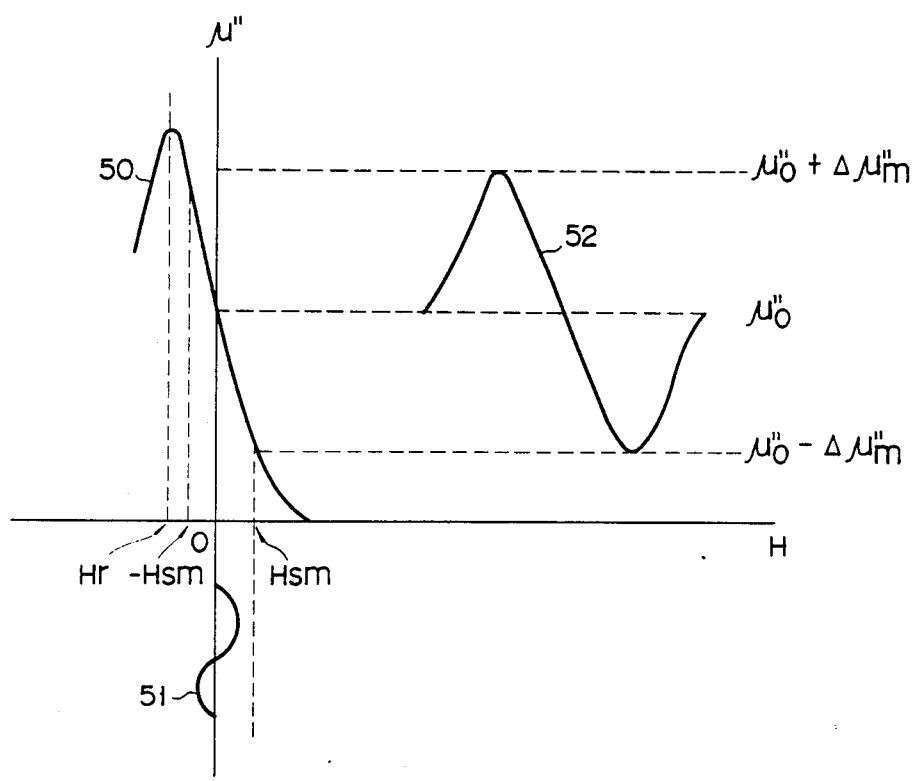
FIG. 11 graphically illustrates a variation of the loss $\mu''$ against an external magnetic field when the magnetic material in the embodiment of FIG. 10 magnetically resonates.
Figure 12:
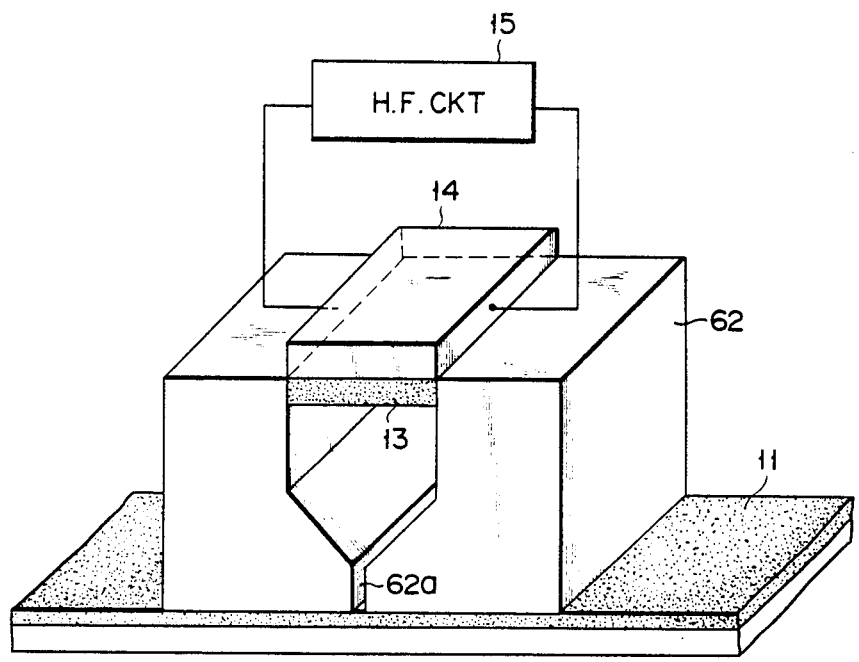
FIG. 12 shows a further embodiment of a magnetic playback apparatus according to the present invention, which is featured in that a magnetic material is inserted in a magnetic circuit formed by a head magnetic pole with a gap.
Figure 13:
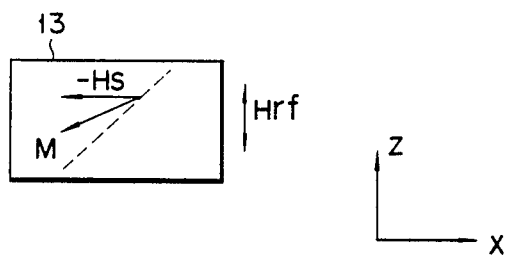
FIG. 13 shows a change of a magnetic moment against a signal magnetic field in the FIG. 12 embodiment.

Such is implemented into the arrangement of FIG. 12. As shown, a head pole 62 with a magnetic gap 62a is disposed close to magnetic recording medium 11. A magnetic material 13, of which the high frequency characteristics changes with the signal magnetic field, is assembled into the head pole 62. A conductive layer 14 in contact with or close to magnetic material 13 is connected to high frequency circuit 15. The magnetic material 13 is applied, through the magnetic pole 62, with a signal magnetic field directed in the length direction of the recording track. The magnetic material 13 is provided with magnetic anisotropy so as to have an easy axis oriented about 45°, in the slanted broken line direction, to the signal magnetic field $H_S$. A high frequency magnetic field $H_{RF}$ is developed in the direction z, since a high frequency current flows in the direction x in conductive layer 14. With this arrangement, in the magnetic material 13, the magnetic moments M are aligned in the direction of the easy axis when $H_S=0$. Application of the signal magnetic field $H_S$ to magnetic material 13 in the direction $-x$ turns the magnetic moments M toward the direction x, which are finally directed orthogonal to the high frequency magnetic field $H_{RF}$. Therefore, if the ferromagentic resonance condition is set as shown in FIG. 11 as in the FIG. 9 embodiment, a great variation of $\mu''$ may be obtained.

Figure 14:
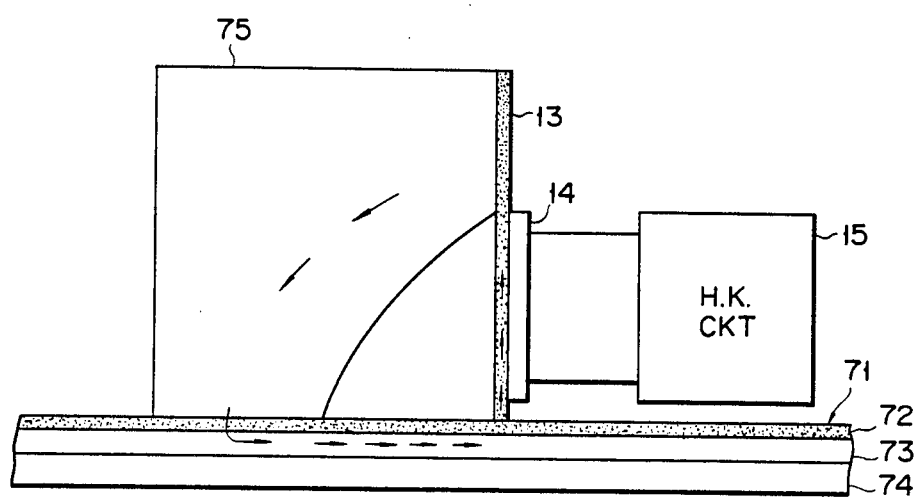
FIG. 14 schematically illustrates a device constructed by applying the present invention, for playing back a playback, a vertical magnetic recording signal.

An embodiment of the present invention for reproduction of vertically recorded signals is illustrated in FIG. 14. As shown, a perpendicular magnetic recording medium 71 is formed of a perpendicular recording layer 72 made of Co-Cr, a high permiability magnetic layer 73 of permalloy, and a base layer 74. A main pole 13 is coupled to one side of a magnetic yoke 75 for forming a magnetic circuit. A conductive layer 14, disposed close to main pole 13, is coupled with high frequency circuit 15.

Figure 15:
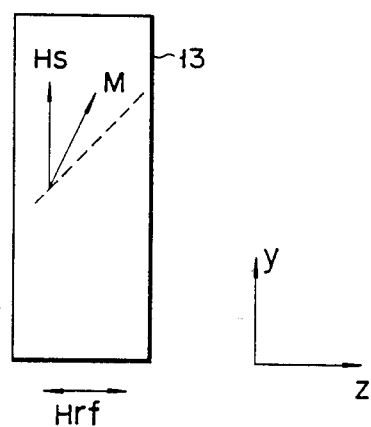
FIG. 15 shows the changed orientation of a magnetic moment against a signal magnetic field in the FIG. 14 embodiment.

Anisotropy is set up in main pole 13, so that an easy axis is slanted about 45° in the direction (as indicated by a broken line) of the signal magnetic field $H_S$ (direction y), as shown in FIG. 15. A high frequency signal current flowing through conductive layer 14 in the direction y causes a high frequency magnetic field to develop in the track width direction (direction z). The magnetic moment M is aligned in the direction of the easy axis at Hc=0. As seen from FIG. 15, as the signal magnetic field Hc is increased, the magnetic moment M is directed toward the direction y to be orthogonal to high frequency magnetic field $H_{RF}$. Therefore, if the ferromagnetic resonance magnetic field $H_R$ is set in the direction of the positive signal magnetic field (direction y), as shown in FIG. 4, as in the FIG. 1 embodiment, $\mu''$ greatly varies with a variation of the signal magnetic field $H_S$.

A further embodiment of the present invention will be described. If, in equation (2), the frequency f of the high frequency magnetic field or the anisotropic magnetic field $H_K$ is appropriately selected, the ferromagnetic resonance magnetic field $H_R$ may be set close to the saturation magnetic field of the thin-film magnetic material in the direction x. One of the setting examples is shown in FIG. 16. When Co amorphous alloy is used for the magnetic thin film 13, $\mu''$ varies with the external magnetic field H, as shown in FIG. 16. In this embodiment, the ferromagnetic resonance magnetic field $H_R$ is set slightly larger than the saturation magnetic field $H_S$. A bias magnetic field Hb is set smaller than the saturation magnetic field $H_S$, at a point where $\mu''$ sharply changes. A signal magnetic field is superposed on the bias magnetic field Hb. This embodiment thus arranged keeps the magnetic thin film 13 in unsaturated high permeability state or in a low magnetic resistance state as a part of head pole 62. Further, a large change of $\mu''$ of magentic thin film 13 may be gained.

A magnetic anisotropy having an easy axis orthogonal to the signal magnetic field may be set up in the thin film 13 to develop an anisotropic magnetic field $H_K$, so that $\mu''$ is made small at zero magnetic field. This allows $\mu''$ to sharply change according to the change of the signal magnetic field.

FIG. 17 illustrates the motion of the magnetic moments M when the anisotropic magnetic field $H_K$ is applied to the thin film 13 of FIG. 12 in the direction z, the signal magnetic field $H_S$ is applied thereto in the direction x, and the high frequency magnetic field $H_{RF}$ is applied thereto in the direction y through conductive layer 14 of FIG. 12. FIG. 17A shows the magnetic moments M when signal $H_{Sig}=0$. As shown, the magnetic moments M are kept in the same direction as the anisotropic magnetic field $H_K$. Under this condition, if the signal magnetic field $H_{Sig}$ is applied to magnetic thin film 13, the magnetic moments M turns to the direction of $H_{Sig}$ as shown in FIG. 17B. When the applied signal magnetic field $H_{Sig}$ exceeds the anisotropic magnetic field $H_K$, the magnetic moments M are aligned in the direction x, as shown in FIG. 17C, so that the magnetic thin film 13 is saturated. When $H_{Sig}=0$ as shown in FIG. 17A, the magnetic moments M are in parallel with the high frequency magnetic field $H_{RF}$. Therefore, no ferromagentic resonance occurs. By setting the ferromagnetic resonance magnetic field $H_R$ in the vicinity of the anisotropic magnetic field $H_K$, when the signal magnetic field $H_{Sig}$ is applied $\mu'$ and $\mu''$ sharply change with the rotatation of the magnetic moments M in the direction of the signal magnetic field $H_S$.

$\mu''$ of the permalloy thin film having the above anisotropy varies with the external magnetic field H, as shown in FIG. 18. In FIG. 18, the anisotropic magnetic field $H_K$ is about 3[Oe], the external resonance magnetic field is 4.5[Oe], and a frequency f of the high frequency magnetic field $H_{RF}$ is 350 MHz. If necessary, the ferromagnetic resonance magnetic field $H_R$ may be selected smaller than the saturation magnetic field Hs or the anisotropic magnetic field $H_K$.

What is claimed is:

1. An apparatus for reproducing a signal recorded on a magnetic recording medium, comprising:
    a magnetic head having a thin film of magnetic material, said magnetic-material thin film having uniaxial magnetic anisotropy to produce an anisotropic magnetic field in a single direction therein and said magnetic-material thin film being adapted to receive a signal magnetic field resulting from a signal recorded on said magnetic recording medium when said magnetic head contacts said magnetic recording medium to reproduce the signal;

high frequency circuit means coupled to said magnetic head for applying a high frequency current to said magnetic head to produce a high-frequency magnetic field in said magnetic-material thin film so as to cause a ferromagnetic resonance in said magnetic-material thin film using at least the anisotropic magnetic field and the high-frequency magnetic field; and reproducing circuit means coupled to said high-frequency circuit means for reproducing the signal recorded on said recording medium in response to a variation of a high-frequency output signal of said high frequency circuit means resulting from a variation in a high frequency characteristic of said magnetic-material thin film with the signal magnetic field, the high frequency characteristic of said magnetic material thin film depending on the ferromagnetic resonance.

2. The apparatus according to claim 1, wherein the magnitude of the anisotropic magnetic field is set such that the ferromagnetic resonance occurs under condition where a bias magnetic field is substantially zero.

3. The apparatus according to claim 1, wherein the anisotropic magnetic field in said magnetic-material thin film is directed in substantially the same direction as the signal magnetic field passing through said magnetic-material thin film.

4. The apparatus according to claim 1, wherein the anisotropic magnetic field in said magnetic-material thin film is directed in a direction substantially perpendicular to the signal magnetic field passing through said magnetic-material thin film.

5. The apparatus according to claim 1, wherein the anisotropic magnetic field in said magnetic-material thin film is directed slatwise with respect to the signal magnetic field passing through said magnetic-material thin film.

6. The apparatus according to claim 5, wherein an angle between the anisotropic magnetic field and the signal magnetic field is 45 degrees.

7. The apparatus according to claim 1, wherein the anisotropic magnetic field in said magnetic-material thin film is directed in substantially the same direction as the signal magnetic field passing through said magnetic-material thin film, and a ferromagnetic resonance condition is set such that the high-frequency characteristic of said magnetic-material thin film linearly varies with the signal magnetic field under a condition where a bias magnetic field is substantially zero.

8. The apparatus according to claim 1, wherein the anisotropic magnetic field in said magnetic-material thin film is directed in substantially the same direction as the signal magnetic field passing through said magnetic material thin film, and a ferromagnetic resonance condition is set such that the high frequency characteristic of said magnetic material thin film symmetrically varies with the signal magnetic field under a condition that a bias magnetic field is substantially zero.

9. The apparatus according to claim 1, wherein said magnetic-material thin film is disposed perpendicular to said recording medium.

10. The apparatus according to claim 1, wherein said magnetic-material thin film is disposed perpendicular to a recording surface of said recording medium and the lengthwise direction of a track of said recording medium;

the anisotropic magnetic field is directed perpendicular to the recording surface of said recording medium; and said high-frequency circuit means is coupled to said magnetic head such that the high-frequency magnetic field is generated in a plane of said magnetic-material thin film.

11. The apparatus according to claim 1, wherein said magnetic-material thin film is disposed perpendicular to a recording surface of said recording medium and the lengthwise direction of a track of said recording medium;

the anisotropic magnetic field is directed perpendicular to the lengthwise direction of the track of said recording medium; and said high-frequency circuit means is coupled to said magnetic head such that the high-frequency magnetic field is generated in a plane perpendicular to the anisotropic field in said magnetic-material thin film.

12. The apparatus according to claim 1, wherein said magnetic-material thin film is disposed perpendicular to a recording surface of said recording medium and the lengthwise direction of a track of said recording medium;

the anisotropic magnetic field is directed slantwise with respect to the recording surface of said recording medium; and said high-frequency circuit means is coupled to said magnetic head such that the high-frequency magnetic field is generated in a plane perpendicular to the recording surface and parallel to the lengthwise direction of the track of said recording medium.

13. The apparatus according to claim 1, wherein said recording medium is a perpendicular recording medium.

14. The apparatus according to claim 1, wherein said magnetic head is a ring-shaped head, and said magnetic-material thin film constitutes a part of a magnetic circuit of said ring-shaped head.

15. The apparatus according to claim 1, wherein said magnetic-thin film is formed of ferrite.

16. The apparatus according to claim 1, wherein said magnetic-material thin film is formed of permalloy.

17. The apparatus according to claim 1, wherein said magnetic-material thin film is formed of amorphous alloy.

18. An apparatus for reproducing a signal recorded on a magnetic recording medium, comprising:

a magnetic head having a thin film of magnetic material, said magnetic material thin film having uniaxial magnetic anisotropy to produce an anisotropic magnetic field in a single direction therein and said magnetic material thin film being adapted to receive a signal magnetic field resulting from a signal recorded on said magnetic recording medium when said magnetic head contacts said magnetic recording medium to reproduce the signal;

high frequency circuit means coupled to said magnetic head for applying a high frequency current to said magnetic head to produce a high frequency magnetic field in said magnetic material thin film so as to cause a ferromagnetic resonance in said magnetic material thin film using at least the anisotropic magnetic field and the high frequency magnetic field, the ferromagnetic resonance being caused in the vicinity of a saturation magnetic field of said magnetic material thin film; and reproducing circuit means coupled to said high frequency circuit means for reproducing the signal recorded on said recording medium in response to a variation of a high frequency output signal of said high frequency circuit means resulting from a variation in a high frequency characteristic of said magnetic material thin film with the signal magnetic field, the high frequency characteristic of said magnetic material thin film depending on the ferromagnetic resonance.

19. The apparatus according to claim 18, wherein the anisotropic magnetic field in said magnetic material thin film is directed substantially perpendicular to the signal magnetic field passing through said magnetic material thin film.

20. The apparatus according to claim 18, wherein said high frequency circuit means is coupled to said magnetic head such that the high frequency magnetic field is generated in said magnetic material thin film in substantially the same direction as the anisotropic magnetic field.

* * * * *